United States Patent
Cheng et al.

(10) Patent No.: US 9,619,758 B2
(45) Date of Patent: Apr. 11, 2017

(54) METHOD AND APPARATUS FOR LABELING TRAINING SAMPLES

(71) Applicant: Baidu Online Network Technology (Beijing) Co., Ltd, Beijing (CN)

(72) Inventors: Huige Cheng, Beijing (CN); Yaozong Mao, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 236 days.

(21) Appl. No.: 14/586,902

(22) Filed: Dec. 30, 2014

(65) Prior Publication Data
US 2016/0063395 A1    Mar. 3, 2016

(30) Foreign Application Priority Data
Aug. 28, 2014 (CN) .......................... 2014 1 0433020

(51) Int. Cl.
G06F 15/18 (2006.01)
G06N 99/00 (2010.01)
G06N 7/00 (2006.01)

(52) U.S. Cl.
CPC .......... *G06N 99/005* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 6,937,994 B1* | 8/2005 | Iyengar | G06Q 30/02 705/7.29 |
| 2004/0205482 A1* | 10/2004 | Basu | G06F 17/30787 707/E17.009 |
| 2009/0049002 A1* | 2/2009 | He | G06N 99/005 706/59 |
| 2011/0040711 A1* | 2/2011 | Perronnin | G06K 9/6232 706/12 |

FOREIGN PATENT DOCUMENTS

CN    103324632 A    9/2013

OTHER PUBLICATIONS

Blum, A., et al., "Combining Labeled and Unlabeled Data with Co-Training," Computational Learning Theory, ACM, 2 Penn Plaza, Suite 701, New York, NY 10121-0701, USA; pp. 92-100, Jul. 24, 1998.

* cited by examiner

*Primary Examiner* — Luis Sitiriche
(74) *Attorney, Agent, or Firm* — Orrick, Herrington & Sutcliffe LLP

(57) ABSTRACT

Provided in the present invention are a method and apparatus for labeling training samples. In the embodiments of the present invention, two mutually independent classifiers, i.e. a first classifier and a second classifier, are used to perform collaborative forecasting on M unlabeled first training samples to obtain some of the labeled first training samples, without the need for the participation of operators; the operation is simple and the accuracy is high, thereby improving the efficiency and reliability of labeling training samples.

20 Claims, 2 Drawing Sheets

METHOD AND APPARATUS FOR LABELING TRAINING SAMPLES

CROSS-REFERENCE TO RELATED APPLICATIONS

Figure 1:
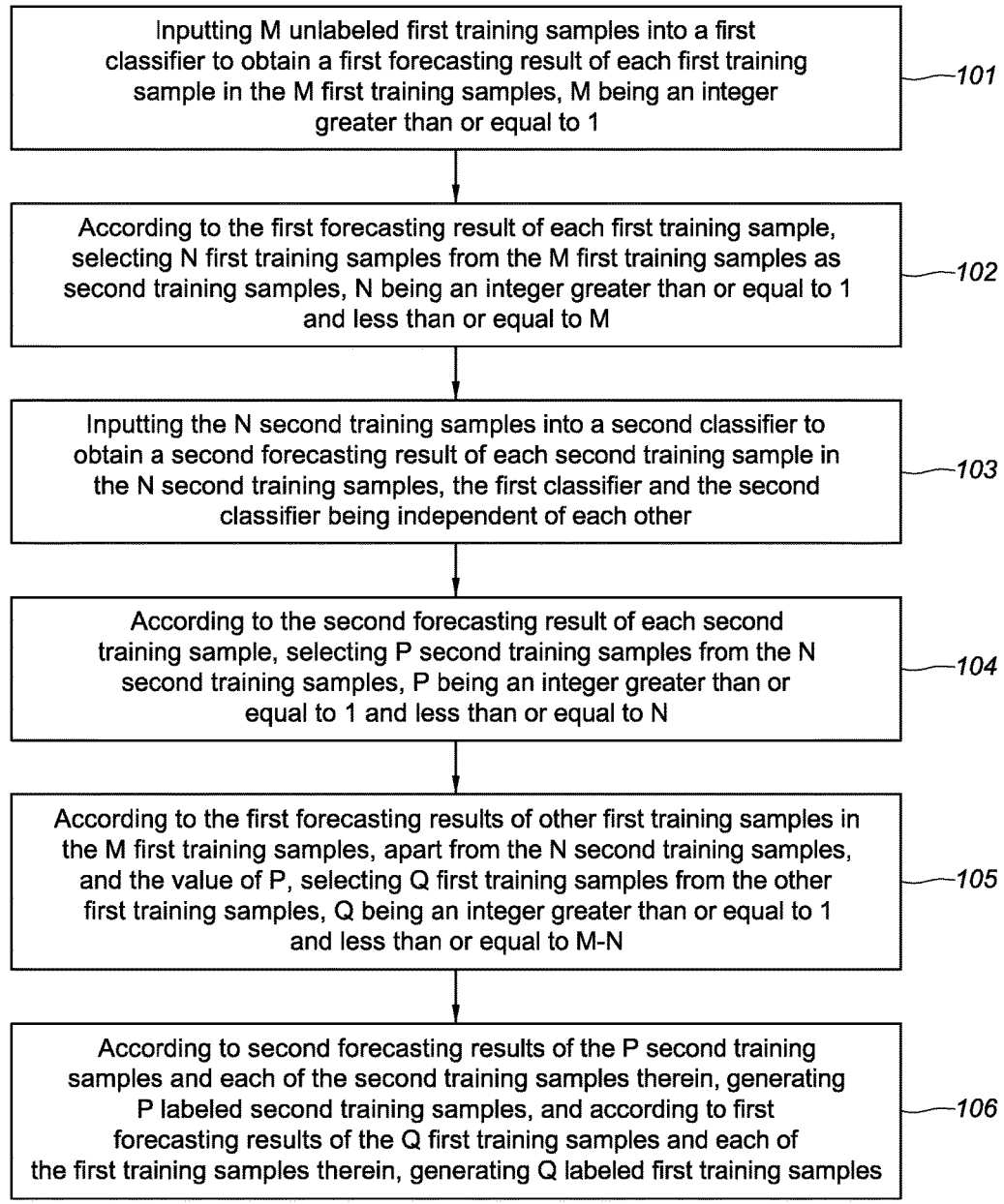

The present application claims priority to Chinese Patent Application CN201410433020.8, filed on Aug. 28, 2014, the entire disclosure of which is incorporated herein by reference in its entirety and for all purposes.

TECHNICAL FIELD

The present invention relates to machine learning technology, and in particular to a method and apparatus for labeling training samples.

BACKGROUND

A classification model, i.e. a classifier, is built using machine learning technology, which may be generally divided into three phases: sample labeling, feature extraction and model training in a training phase. In the prior art, unlabeled training samples, i.e. data of unknown types, need to be manually labeled one by one, so as to obtain labeled training samples, i.e. data of known types, and then a large number of training samples of the known types may be used to built a classifier. The classifier may be applied in many scenarios, for example, since more and more spam pages are generated due to network fraud, which seriously impacts the retrieval efficiency of a search engine and the user experience, counteracting fraud has become one of the most important challenges faced by the search engine, and labeled normal data and fraud data may be used to built a classifier to identify network data. Regarding machine learning, the greater the number of training samples, the higher the classification accuracy rate of the built classifier, and a large number of known types of training samples need to be acquired.

However, the operation of manually labeling a large number of training samples is complex and prone to error, thereby resulting in the reduction of the efficiency and reliability of labeling the training samples.

SUMMARY

A method and apparatus for labeling training samples are provided in a plurality of aspects of the present invention, so as to improve the efficiency and reliability of labeling the training samples.

A method for labeling training samples is provided in one aspect of the present invention, comprising:

inputting M unlabeled first training samples into a first classifier to obtain a first forecasting result of each first training sample in the M first training samples, M being an integer greater than or equal to 1;

according to the first forecasting result of each first training sample, selecting, from the M first training samples, N first training samples as second training samples, N being an integer greater than or equal to 1 and less than or equal to M;

inputting the N second training samples into a second classifier to obtain a second forecasting result of each second training sample in the N second training samples, the first classifier and the second classifier being independent of each other;

according to the second forecasting result of each second training sample, selecting, from the N second training samples, P second training samples, P being an integer greater than or equal to 1 and less than or equal to N;

according to first forecasting results of other first training samples in the M first training samples, except the N second training samples, and the value of P, selecting, from the other first training samples, Q first training samples, Q being an integer greater than or equal to 1 and less than or equal to M−N; and according to second forecasting results of the P second training samples and each of the second training samples therein, generating P labeled second training samples, and according to first forecasting results of the Q first training samples and each of the first training samples therein, generating Q labeled first training samples.

In the aspect as mentioned above and in any possible implementation, an implementation is further provided, and according to the first forecasting result of each first training sample, selecting, from the M first training samples, N first training samples as second training samples comprises:

obtaining the probability that the first training samples indicated by the first forecasting result are of a designated type; and selecting, from the M first training samples, the N first training samples of which the probability that the first training samples indicated by the first forecasting result are of a designated type satisfies a pre-set first training condition as the second training samples.

In the aspect as mentioned above and in any possible implementation, an implementation is further provided, and the first training condition comprises:

the probability that the first training samples indicated by the first forecasting result are of a designated type is greater than or equal to a first threshold value and is less than or equal to a second threshold value.

In the aspect as mentioned above and in any possible implementation, an implementation is further provided, and according to the second forecasting result of each second training sample, selecting, from the N second training samples, P second training samples comprises:

obtaining the probability that the second training samples indicated by the second forecasting result are of a designated type; and selecting, from the N second training samples, the P second training samples of which the probability that the second training samples indicated by the second forecasting result are of a designated type satisfies a pre-set second training condition.

In the aspect as mentioned above and in any possible implementation, an implementation is further provided, and the second training condition comprises:

a designated number with the minimum probability that the second training samples indicated by the second forecasting result are of a designated type.

In the aspect as mentioned above and in any possible implementation, an implementation is further provided, and according to first forecasting results of other first training samples in the M first training samples, except the N second training samples, and the value of P, selecting, from the other first training samples, Q first training samples comprises:

selecting, from the other first training samples, P first training samples of which the probability that the first training samples indicated by the first forecasting result are of a designated type satisfies a pre-set third training condition; and selecting, from the other first training samples, Q−P first training samples of which the probability that the first training samples indicated by the first forecasting result are of a designated type satisfies a pre-set fourth training condition.

In the aspect as mentioned above and in any possible implementation, an implementation is further provided, and the third training condition comprises:

a designated number with the minimum probability that the first training samples indicated by the first forecasting result are of a designated type.

In the aspect as mentioned above and in any possible implementation, an implementation is further provided, and the fourth training condition comprises:

a designated number with the maximum probability that the first training samples indicated by the first forecasting result are of a designated type.

In the aspect as mentioned above and in any possible implementation, an implementation is further provided, and the ratio of Q–P to 2P is a golden ratio.

In the aspect as mentioned above and in any possible implementation, an implementation is further provided, and the designated type comprises a positive-example type or a counter-example type.

An apparatus for labeling training samples is provided in another aspect of the present invention, comprising:

a classification unit for inputting M unlabeled first training samples into a first classifier to obtain a first forecasting result of each first training sample in the M first training samples, M being an integer greater than or equal to 1;

a selection unit for, according to the first forecasting result of each first training sample, selecting, from the M first training samples, N first training samples as second training samples, N being an integer greater than or equal to 1 and less than or equal to M;

the classification unit further being for inputting the N second training samples into a second classifier to obtain a second forecasting result of each second training sample in the N second training samples, the first classifier and the second classifier being independent of each other;

the selection unit further being for, according to the second forecasting result of each second training sample, selecting, from the N second training samples, P second training samples, P being an integer greater than or equal to 1 and less than or equal to N;

the selection unit further being for, according to first forecasting results of other first training samples in the M first training samples, except the N second training samples, and the value of P, selecting, from the other first training samples, Q first training samples, Q being an integer greater than or equal to 1 and less than or equal to M−N; and a processing unit for, according to second forecasting results of the P second training samples and each of the second training samples therein, generating P labeled second training samples, and according to first forecasting results of the Q first training samples and each of the first training samples therein, generating Q labeled first training samples.

In the aspect as mentioned above and in any possible implementation, an implementation is further provided, and the selection unit is specifically used for:

obtaining the probability that the first training samples indicated by the first forecasting result are of a designated type; and selecting, from the M first training samples, the N first training samples of which the probability that the first training samples indicated by the first forecasting result are of a designated type satisfies a pre-set first training condition as the second training samples.

In the aspect as mentioned above and in any possible implementation, an implementation is further provided, and the first training condition comprises:

the probability that the first training samples indicated by the first forecasting result are of a designated type is greater than or equal to a first threshold value and is less than or equal to a second threshold value.

In the aspect as mentioned above and in any possible implementation, an implementation is further provided, and the selection unit is specifically used for:

obtaining the probability that the second training samples indicated by the second forecasting result are of a designated type; and selecting, from the N second training samples, the P second training samples of which the probability that the second training samples indicated by the second forecasting result are of a designated type satisfies a pre-set second training condition.

In the aspect as mentioned above and in any possible implementation, an implementation is further provided, and the second training condition comprises:

a designated number with the minimum probability that the second training samples indicated by the second forecasting result are of a designated type.

In the aspect as mentioned above and in any possible implementation, an implementation is further provided, and the selection unit is specifically used for:

selecting, from the other first training samples, P first training samples of which the probability that the first training samples indicated by the first forecasting result are of a designated type satisfies a pre-set third training condition; and selecting, from the other first training samples, Q–P first training samples of which the probability that the first training samples indicated by the first forecasting result are of a designated type satisfies a pre-set fourth training condition.

In the aspect as mentioned above and in any possible implementation, an implementation is further provided, and the third training condition comprises:

a designated number with the minimum probability that the first training samples indicated by the first forecasting result are of a designated type.

In the aspect as mentioned above and in any possible implementation, an implementation is further provided, and the fourth training condition comprises:

a designated number with the maximum probability that the first training samples indicated by the first forecasting result are of a designated type.

In the aspect as mentioned above and in any possible implementation, an implementation is further provided, and the ratio of Q–P to 2P is a golden ratio.

In the aspect as mentioned above and in any possible implementation, an implementation is further provided, and the designated type comprises a positive-example type or a counter-example type.

It may be seen from the above-mentioned technical solutions that in the embodiments of the present invention, by inputting M unlabeled first training samples into a first classifier to obtain a first forecasting result of each first training sample, and then, according to the first forecasting result of each first training sample, selecting, from the M first training samples, N first training samples as second training samples, and inputting the N second training samples into a second classifier which is independent of the first classifier to obtain a second forecasting result of each second training sample, and then, according to the second forecasting result of each second training sample, selecting, from the N second training samples, P second training samples, and according to first forecasting results of other first training samples in the M first training samples, except the N second training samples, and the value of P, selecting, from other first training samples, Q first training samples, so that P labeled second training samples may be generated according to second forecasting results of the P second training samples and each of the second training samples therein, and Q labeled first training samples may be generated according to first forecasting results of the Q first training samples and each of the first training samples therein. Two mutually independent classifiers, i.e. a first classifier and a second classifier, are used to perform collaborative forecasting on the M unlabeled first training samples to obtain some of the labeled first training samples, without the need for the participation of operators; the operation is simple and the accuracy is high, thereby improving the efficiency and reliability of labeling the training samples.

In addition, by means of the technical solutions provided in the present invention, since the second classifier and the first classifier are not related and are completely independent of each other, the diversity of the training samples of the first classifier built in a next iteration may be increased. Meanwhile, the classification capability of the first classifier may be further increased, and the accuracy rate of the classification results may be further improved.

BRIEF DESCRIPTION OF THE ACCOMPANYING DRAWINGS

In order to illustrate the technical solutions in the embodiments of the present invention more clearly, the accompanying drawings which need to be used in the description of the embodiments or the prior art are briefly introduced below. Obviously, the accompanying drawings in the following description are only some embodiments of the present invention, and those of ordinary skill in the art may further obtain other drawings according to these accompanying drawings without making any inventive effort.

Figure 2:
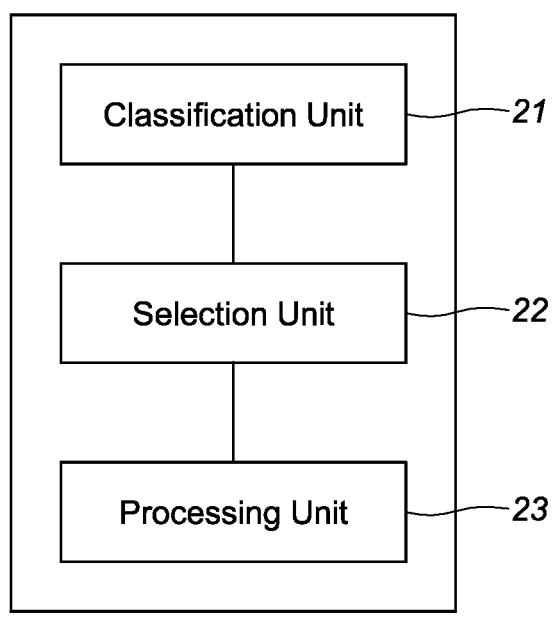

FIG. 1 is a schematic flowchart of a method for labeling training samples provided in an embodiment of the present invention; and FIG. 2 is a structural schematic diagram of an apparatus for labeling training samples provided in another embodiment of the present invention.

DETAILED DESCRIPTION OF THE PREFERRED EMBODIMENTS

In order to make the objectives, technical solutions and advantages of the embodiments of the present invention more clear, the technical solutions in the embodiments of the present invention will be described clearly and completely below in combination with the accompanying drawings in the embodiments of the present invention. Obviously, the embodiments described are some of the embodiments of the present invention rather than all of the embodiments. All other embodiments obtained by those of ordinary skill in the art and based on the embodiments in the present invention without making any inventive effort are within the scope of protection of the present invention.

In addition, the term "and/or" herein is merely an association relationship describing associated objects, and indicates that three relationships may exist, for example, A and/or B may indicate: the three cases where A exists alone, A and B exist simultaneously, and B exists alone. In addition, the character "/" herein generally indicates an "or" relationship between associated objects.

FIG. 1 is a schematic flowchart of a method for labeling training samples provided in an embodiment of the present invention, as shown in FIG. 1.

101. inputting M unlabeled first training samples into a first classifier to obtain a first forecasting result of each first training sample in the M first training samples, M being an integer greater than or equal to 1.

It may be understood that before 101, a few of the labeled initial training samples may form a training sample set to build a first classifier. The labeled initial training samples are data of some known types. Specifically, some labeled initial training samples contained in the training sample set need to be used in advance to perform training, so as to build an initial classifier, i.e. the first classifier used in 101. Specifically, the requirements for the first classifier built may not need to be particularly stringent, for example, the classification accuracy thereof only needs to be greater than or equal to 60%, and thus, it is easy to realize.

102. According to the first forecasting result of each first training sample, selecting, from the M first training samples, N first training samples as second training samples, N being an integer greater than or equal to 1 and less than or equal to M.

103. Inputting the N second training samples into a second classifier to obtain a second forecasting result of each second training sample in the N second training samples, the first classifier and the second classifier being independent of each other.

The so-called first classifier and second classifier being independent of each other may be understood as meaning that the training processes thereof are different, for example, the training samples used thereby are different, or in another example, the classification algorithms used thereby are different, etc.; therefore, the forecasting results of both, i.e. the first forecasting result and the second forecasting result, are also independent of each other.

104. According to the second forecasting result of each second training sample, selecting, from the N second training samples, P second training samples, P being an integer greater than or equal to 1 and less than or equal to N.

105. According to first forecasting results of other first training samples in the M first training samples, except the N second training samples, and the value of P, selecting, from the other first training samples, Q first training samples, Q being an integer greater than or equal to 1 and less than or equal to M−N.

106. According to second forecasting results of the P second training samples and each of the second training samples therein, generating P labeled second training samples, and according to first forecasting results of the Q first training samples and each of the first training samples therein, generating Q labeled first training samples.

It shall be noted that the execution body of 101-106 may be an application located in a local terminal, or may also be a functional unit such as a plug-in or a software development kit (SDK) arranged in the application located in the local terminal, or may also be a classification engine located in a network-side server, which is not particularly limited in this embodiment.

It may be understood that the application may be a local program (nativeApp) installed in a terminal, or may also be a webpage program (webApp) of a browser in the terminal, which is not limited in this embodiment.

In this way, by inputting M unlabeled first training samples into a first classifier to obtain a first forecasting result of each first training sample, and then, according to the first forecasting result of each first training sample, selecting, from the M first training samples, N first training samples as second training samples, and inputting the N second training samples into a second classifier which is independent of the first classifier to obtain a second forecasting result of each second training sample, and then, according to the second forecasting result of each second training sample, selecting, from the N second training samples, P second training samples, and according to first forecasting results of other first training samples in the M first training samples, except the N second training samples, and the value of P, selecting, from other first training samples, Q first training samples, so that P labeled second training samples may be generated according to second forecasting results of the P second training samples and each of the second training samples therein, and Q labeled first training samples may be generated according to first forecasting results of the Q first training samples and each of the first training samples therein. Two mutually independent classifiers, i.e. a first classifier and a second classifier, are used to perform collaborative forecasting on the M unlabeled first training samples to obtain some of the labeled first training samples, without the need for the participation of operators; the operation is simple and the accuracy is high, thereby improving the efficiency and reliability of labeling the training samples.

Optionally, in a possible implementation of this embodiment, in 102, the probability that the first training samples indicated by the first forecasting result are of a designated type may be specifically obtained. Then, the N first training samples of which the probability that the first training samples indicated by the first forecasting result are of a designated type satisfies a pre-set first training condition may be selected from the M first training samples as the second training samples.

Specifically, the designated type may comprise, but is not limited to, a positive-example type and a counter-example type, which is not particularly limited in this embodiment. The first forecasting result is used for indicating that the first training samples are of a positive-example type or a counter-example type. For example, the first forecasting result being 0 may be used to indicate that the first training samples are of a positive-example type, and the first forecasting result being 1 may be used to indicate that the first training samples are of a counter-example type. Or vice versa, the first forecasting result being 1 may be used to indicate that the first training samples are of a positive-example type, and the first forecasting result being 0 may be used to indicate that the first training samples are of a counter-example type. The specific form of the first forecasting result is not particularly limited in this embodiment. If the first forecasting result indicates that the first training samples are of a positive-example type, then it indicates that the first training samples are positive-example samples, i.e. positive samples, which may also be called white samples; conversely, if the first forecasting result indicates that the first training samples are of a counter-example type, then it indicates that the first training samples are counter-example samples, i.e. negative samples, which may also be called black samples.

Specifically, the first training condition may specifically comprise, but is not limited to, the following: the probability that the first training samples indicated by the first forecasting result are of a designated type is greater than or equal to a first threshold value and is less than or equal to a second threshold value.

For example, the first threshold value may be specifically set to 0.4, and the second threshold value may be specifically set to 0.6, then the probability that the first training samples indicated by these first forecasting results satisfying the first training condition are of a designated type may be between 0.4 and 0.6, and regarding the first classifier, the first forecasting results of this part of first training samples are fuzzy; therefore, this portion of first training samples are continuously taken as training samples, i.e. the second training samples, and input into other classifiers, i.e. the second classifier independent of the first classifier. Since the second classifier and the first classifier are not related and are completely independent of each other, the diversity of the training samples of the first classifier built in a next iteration may be increased. Meanwhile, the classification capability of the first classifier may be further increased, and the accuracy rate of the classification results may be further improved.

Furthermore, in 104, the probability that the second training samples indicated by the second forecasting result are of a designated type may be specifically obtained. Then, the P second training samples of which the probability that the second training samples indicated by the second forecasting result are of a designated type satisfies a pre-set second training condition may be selected from the N second training samples.

Specifically, the second training condition may specifically comprise, but is not limited to, the following: a designated number with the minimum probability that the second training samples indicated by the second forecasting result are of a designated type.

For example, the probabilities that the second training samples indicated by the second forecasting result are of a designated type may be specifically ranked in an order from the smallest to largest, and the top-ranked P second training samples are selected. Since in some application scenarios such as anti-fraud scenarios, the proportion of the counter-example samples is very low, and selecting, using the second training condition, the P second training samples of which the probability that the second training samples indicated by the second forecasting result is of a positive-example type satisfies a pre-set second training condition, may increase the proportion of the counter-example samples to some extent.

Accordingly, in 105, P first training samples of which the probability that the first training samples indicated by the first forecasting result are of a designated type satisfies a pre-set third training condition may be specifically selected from the other first training samples, and Q–P first training samples of which the probability that the first training samples indicated by the first forecasting result are of a designated type satisfies a pre-set fourth training condition may be selected from the other first training samples.

Specifically, the third training condition may specifically comprise, but is not limited to, the following: a designated number with the minimum probability that the first training samples indicated by the first forecasting result are of a designated type. For example, the probabilities that the first training samples indicated by the first forecasting result are of a designated type may be specifically ranked in an order from the smallest to largest, and the top-ranked P first training samples are selected.

Specifically, the fourth training condition may specifically comprise, but is not limited to, the following: a designated number with the maximum probability that the first training samples indicated by the first forecasting result are of a designated type. For example, the probabilities that the first training samples indicated by the first forecasting result are of a designated type may be specifically ranked in an order from the smallest to largest, and the bottom-ranked Q–P first training samples are selected.

Preferably, the ratio of Q–P to 2P is a golden ratio, for example, 1.618. In this way, by limiting the ratio of the selected positive-example samples to the counter-example samples to be a golden ratio, the unbalancing of samples in the training sample set may be effectively reduced.

By then, the generated labeled P second training samples, the generated labeled P first training samples and the generated labeled Q–P first training samples may be added to the training sample set, and the new training sample set is used to re-built a new first classifier. In this way, the new first classifier built may be used to enter a next iteration, and 101-106 are executed circularly until the first classifier built or the training sample set satisfies a termination condition of the first classifier, for example, the classification accuracy rate is greater than or equal to a pre-set accuracy rate threshold value or the number of first training samples contained in the training sample set is greater than or equal to a pre-set number threshold value, which is not particularly limited in this embodiment.

In this embodiment, two mutually independent classifiers, i.e. a first classifier and a second classifier, are used to perform collaborative forecasting on M unlabeled first training samples to obtain some of the labeled first training samples, without the need for the participation of operators; the operation is simple and the accuracy is high, thereby improving the efficiency and reliability of labeling the training samples.

In addition, by means of the technical solutions provided in the present invention, since the second classifier and the first classifier are not related and are completely independent of each other, the diversity of the training samples of the first classifier built in a next iteration may be increased. Meanwhile, the classification capability of the first classifier may be further increased, and the accuracy rate of the classification results may be further improved.

It shall be noted that, regarding the foregoing method embodiments, and for the sake of a simple description, the methods are described as a series of action combinations, but those of ordinary skill in the art shall know that the present invention is not limited to the action sequence described, because according to the present invention, some steps may be performed in other sequences or may be performed simultaneously. Next, those skilled in the art shall also know that the embodiments described in the description are all preferred embodiments, and the actions and modules involved are not necessarily required in the present invention.

In the above-mentioned embodiments, the description of each embodiment has its own emphasis, and for a part that is not detailed in a certain embodiment, reference may be made to the relevant description of other embodiments.

FIG. 2 is a structural schematic diagram of an apparatus for labeling training samples provided in another embodiment of the present invention, as shown in FIG. 2. The apparatus for labeling the training samples in this embodiment may comprise a classification unit 21, a selection unit 22 and a processing unit 23. The classification unit 21 is used for inputting M unlabeled first training samples into a first classifier to obtain a first forecasting result of each first training sample in the M first training samples, M being an integer greater than or equal to 1; the selection unit 22 is used for, according to the first forecasting result of each first training sample, selecting, from the M first training samples, N first training samples as second training samples, N being an integer greater than or equal to 1 and less than or equal to M; the classification unit 21 is also used for inputting the N second training samples into a second classifier to obtain a second forecasting result of each second training sample in the N second training samples, the first classifier and the second classifier being independent of each other; the selection unit 22 is also used for, according to the second forecasting result of each second training sample, selecting, from the N second training samples, P second training samples, P being an integer greater than or equal to 1 and less than or equal to N; the selection unit 22 is also used for, according to first forecasting results of other first training samples in the M first training samples, except the N second training samples, and the value of P, selecting, from the other first training samples, Q first training samples, Q being an integer greater than or equal to 1 and less than or equal to M–N; and the processing unit 23 is used for generating, according to second forecasting results of the P second training samples and each of the second training samples therein, P labeled second training samples, and generating, according to first forecasting results of the Q first training samples and each of the first training samples therein, Q labeled first training samples.

It shall be noted that the classification apparatus provided in this embodiment may be an application located in a local terminal, or may also be a functional unit such as a plug-in or a software development kit (SDK) arranged in the application located in the local terminal, or may also be a classification engine located in a network-side server, which is not particularly limited in this embodiment.

It may be understood that the application may be a local program (nativeApp) installed in a terminal, or may also be a webpage program (webApp) of a browser in the terminal, which is not limited in this embodiment.

Optionally, in a possible implementation of this embodiment, the selection unit 22 may be specifically used for obtaining the probability that the first training samples indicated by the first forecasting result are of a designated type; and selecting, from the M first training samples, the N first training samples of which the probability that the first training samples indicated by the first forecasting result are of a designated type satisfies a pre-set first training condition as the second training samples.

Specifically, the designated type may comprise, but is not limited to, a positive-example type and a counter-example type, which is not particularly limited in this embodiment. If the first forecasting result indicates that the first training samples are of a counter-example type, then it indicates that the first training samples are positive-example samples, i.e. positive samples, which may also be called white samples; conversely, if the first forecasting result indicates that the first training samples are of a positive-example type, then it indicates that the first training samples are counter-example samples, i.e. negative samples, which may also be called black samples.

Specifically, the first training condition may specifically comprise, but is not limited to, the following: the probability that the first training samples indicated by the first forecasting result are of a designated type is greater than or equal to a first threshold value and is less than or equal to a second threshold value.

Furthermore, the selection unit 22 may be specifically used for obtaining the probability that the second training samples indicated by the second forecasting result are of a designated type; and selecting, from the N second training samples, the P second training samples of which the probability that the second training samples indicated by the second forecasting result are of a designated type satisfies a pre-set second training condition.

Specifically, the second training condition may specifically comprise, but is not limited to, the following: a designated number with the minimum probability that the second training samples indicated by the second forecasting result are of a designated type.

Accordingly, the selection unit 22 may be specifically used for selecting, from the other first training samples, P first training samples of which the probability that the first training samples indicated by the first forecasting result are of a designated type satisfies a pre-set third training condition; and selecting, from the other first training samples, Q–P first training samples of which the probability that the first training samples indicated by the first forecasting result are of a designated type satisfies a pre-set fourth training condition.

Specifically, the third training condition may specifically comprise, but is not limited to, the following: a designated number with the minimum probability that the first training samples indicated by the first forecasting result are of a designated type.

Specifically, the fourth training condition may specifically comprise, but is not limited to, the following: a designated number with the maximum probability that the first training samples indicated by the first forecasting result are of a designated type.

Preferably, the ratio of Q–P to 2P is a golden ratio, for example, 1.618. In this way, by limiting the ratio of the selected positive-example samples to the counter-example samples to be a golden ratio, the unbalancing of samples in the training sample set may be effectively reduced.

It shall be noted that the method in the embodiment corresponding to FIG. 1 may be realized by the apparatus for labeling training samples which is provided in this embodiment. Reference may be made to the relevant contents in the embodiment corresponding to FIG. 1 for a detailed description, which will not be described here.

In this embodiment, two mutually independent classifiers, i.e. a first classifier and a second classifier, are used to perform collaborative forecasting on M unlabeled first training samples to obtain some of the labeled first training samples, without the need for the participation of operators; the operation is simple and the accuracy is high, thereby improving the efficiency and reliability of labeling the training samples.

In addition, by means of the technical solutions provided in the present invention, since the second classifier and the first classifier are not related and are completely independent of each other, the diversity of the training samples of the first classifier built in a next iteration may be increased. Meanwhile, the classification capability of the first classifier may be further increased, and the accuracy rate of the classification results may be further improved.

Those of ordinary skill in the art may clearly understand that, for convenience and brevity of description, the specific operation processes of the above systems, apparatuses, and units may refer to the corresponding processes in the method embodiments, which will not be described here.

In a few embodiments provided in the present invention, it shall be understood that the disclosed systems, apparatuses and methods may be implemented in other manners. For example, the apparatus embodiments described above are merely illustrative, for example, the division of the units is merely a logical function division, and there may be other division manners during actual implementation, for example, a plurality of units or components may be combined or may be integrated into another system, or some features may be omitted or not carried out. In another point, the shown or discussed coupling or direct coupling or communication connection may be an indirect coupling or a communication connection via some interfaces, apparatuses, or units, and may be electrical, mechanical, or in other forms.

The units described as separate components may or may not be physically separate, and components displayed as units may or may not be physical units, that is, they may be located in one position, or may also be distributed on a plurality of network elements. Some or all of the units may be selected according to actual needs to achieve the objectives of the solutions of the present embodiments.

In addition, various functional units in various embodiments of the present invention may be integrated into one processing unit, or each of the units may also exist alone physically, or two or more than two units may be integrated into one unit. The above-mentioned integrated unit may be implemented in the form of hardware, and may also be implemented in the form of hardware and software functional units.

The integrated unit implemented by software functional units may be stored in a computer readable storage medium. The above-mentioned software functional units are stored in a storage medium and include several instructions for making a computer device (which may be a personal computer, a server, or a network device and so on) or a processor execute some steps of the method described in the embodiments of the present invention. The foregoing storage medium comprises: various medium that may store program codes, such as a U-disk, a removable hard disk, a read-only memory (ROM), a random access memory (RAM), a magnetic disk, or an optical disk.

It shall finally be noted that the embodiments above are merely used for illustrating the technical solutions of the present invention rather than limiting same; although the present invention is described in detail with reference to the foregoing embodiments, those of ordinary skill in the art shall understand that they may still make modifications to the technical solutions stated in the foregoing various embodiments or make equivalent replacements to some of the technical features thereof; and these modifications or replacements shall not result in the essence of the corresponding technical solutions departing from the spirit and scope of the technical solutions of various embodiments of the present invention.

What is claimed is:

1. A method for labeling training samples, comprising:
inputting M unlabeled first training samples into a first classifier to obtain a first forecasting result of each first training sample in the M first training samples, M being an integer greater than or equal to 1;
selecting N first training samples as second training samples from the M first training samples based upon the first forecasting result of each first training sample, N being an integer greater than or equal to 1 and less than or equal to M;
inputting the N second training samples into a second classifier to obtain a second forecasting result of each second training sample in the N second training samples, the first classifier and the second classifier being independent of each other;

selecting P second training samples from the N second training samples based upon the second forecasting result of each second training sample, P being an integer greater than or equal to 1 and less than or equal to N;

selecting Q first training samples from other first training samples based upon the first forecasting results of other first training samples in the M first training samples apart from the N second training samples and the value of P, Q being an integer greater than or equal to 1 and less than or equal to a difference between M and N; and generating P labeled second training samples based upon second forecasting results of the P second training samples and each of the second training samples therein; and generating Q labeled first training samples based upon first forecasting results of the Q first training samples and each of the first training samples therein.

2. The method of claim 1, wherein, said selecting the N first training samples comprises:

obtaining a first probability that said first training samples indicated by the first forecasting result are of a preselected type; and selecting, from the M first training samples, the N first training samples of which the first probability satisfies a pre-set first training condition as the second training samples.

3. The method of claim 2, wherein the first training condition comprises a probability that the first training samples indicated by the first forecasting result are of a designated type is greater than or equal to a first threshold value and is less than or equal to a second threshold value.

4. The method of claim 2, wherein said selecting the P second training samples comprises:

obtaining a second probability that the second training samples indicated by the second forecasting result are of a designated type; and selecting, from the N second training samples, the P second training samples of which the second probability satisfies a pre-set second training condition.

5. The method of claim 4, wherein the second training condition comprises a designated number with a minimum probability that the second training samples indicated by the second forecasting result are of a designated type.

6. The method of claim 4, wherein said selecting the Q first training samples comprises:

selecting, from the other first training samples, P first training samples of which a third probability that the first training samples indicated by the first forecasting result are of a designated type satisfies a pre-set third training condition; and selecting, from the other first training samples, Q–P first training samples of which the third probability satisfies a pre-set fourth training condition.

7. The method of claim 6, wherein the third training condition comprises a designated number with a minimum probability that the first training samples indicated by the first forecasting result are of a designated type.

8. The method of claim 6, wherein the fourth training condition comprises a designated number with the maximum probability that the first training samples indicated by the first forecasting result are of a designated type.

9. The method of claim 6, wherein a ratio of Q–P to 2P is a golden ratio.

10. The method of claim 2, wherein the designated type comprises at least one of a positive-example type and a counter-example type.

11. An apparatus for labeling training samples, comprising:

a classification system for inputting M unlabeled first training samples into a first classifier to obtain a first forecasting result of each first training sample in the M first training samples, M being an integer greater than or equal to 1;

a selection system for, according to the first forecasting result of each first training sample, selecting, from the M first training samples, N first training samples as second training samples, N being an integer greater than or equal to 1 and less than or equal to M;

said classification system further being for inputting the N second training samples into a second classifier to obtain a second forecasting result of each second training sample in the N second training samples, the first classifier and the second classifier being independent of each other;

said selection system further being for, according to the second forecasting result of each second training sample, selecting, from said N second training samples, P second training samples, P being an integer greater than or equal to 1 and less than or equal to N;

said selection system further being for, according to first forecasting results of other first training samples in the M first training samples, apart from the N second training samples, and the value of P, selecting, from the other first training samples, Q first training samples, Q being an integer greater than or equal to 1 and less than or equal to a difference of M-N; and a processing system for generating, according to second forecasting results of the P second training samples and each of the second training samples, P labeled second training samples, and generating, according to first forecasting results of the Q first training samples and each of the first training samples therein, Q labeled first training samples.

12. The apparatus of claim 11, wherein said selection system is configured for:

obtaining a first probability that said first training samples indicated by the first forecasting result are of a preselected type; and selecting, from the M first training samples, the N first training samples of which the first probability satisfies a pre-set first training condition as the second training samples.

13. The apparatus of claim 12, wherein the first training condition comprises a probability that the first training samples indicated by the first forecasting result are of a designated type is greater than or equal to a first threshold value and is less than or equal to a second threshold value.

14. The apparatus of claim 12, wherein said selection system is configured for:

obtaining a second probability that the second training samples indicated by the second forecasting result are of a designated type; and selecting, from the N second training samples, the P second training samples of which the second probability satisfies a pre-set second training condition.

15. The apparatus of claim 14, wherein the second training condition comprises a designated number with a minimum probability that the second training samples indicated by the second forecasting result are of a designated type.

16. The apparatus of claim 14, wherein said selection system is configured for:

selecting, from the other first training samples, P first training samples of which a third probability that the first training samples indicated by the first forecasting result are of a designated type satisfies a pre-set third training condition; and selecting, from the other first training samples, Q–P first training samples of which the third probability satisfies a pre-set fourth training condition.

17. The apparatus of claim 16, wherein the third training condition comprises a designated number with a minimum probability that the first training samples indicated by the first forecasting result are of a designated type.

18. The apparatus of claim 16, wherein the fourth training condition comprises a designated number with a maximum probability that the first training samples indicated by the first forecasting result are of a designated type.

19. The apparatus of claim 16, wherein the ratio of Q–P to 2P is a golden ratio.

20. The apparatus of claim 19, wherein the designated type comprises at least one of a positive-example type and a counter-example type.

* * * * *